UNITED STATES PATENT OFFICE.

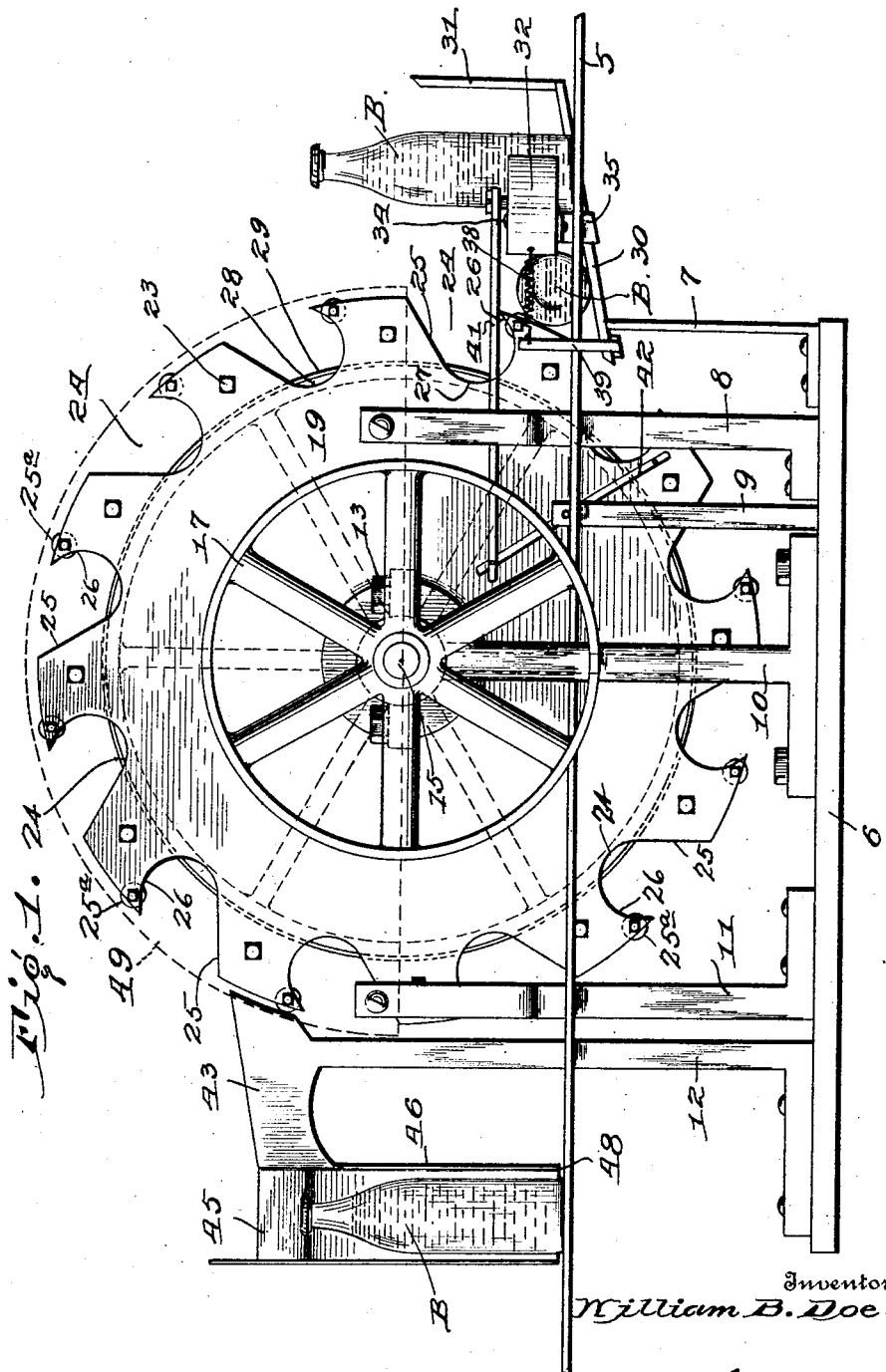

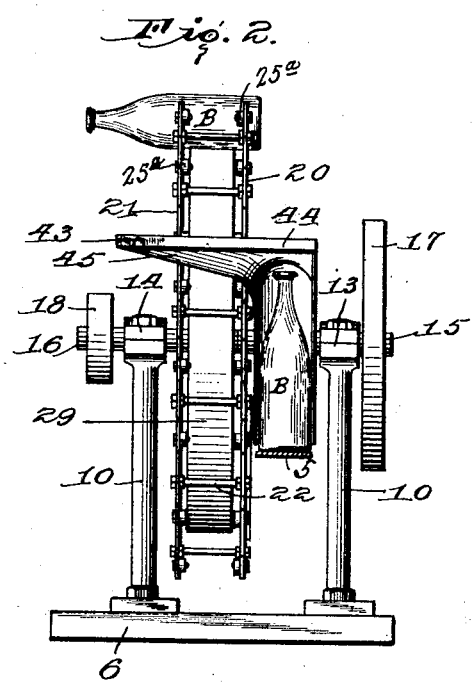
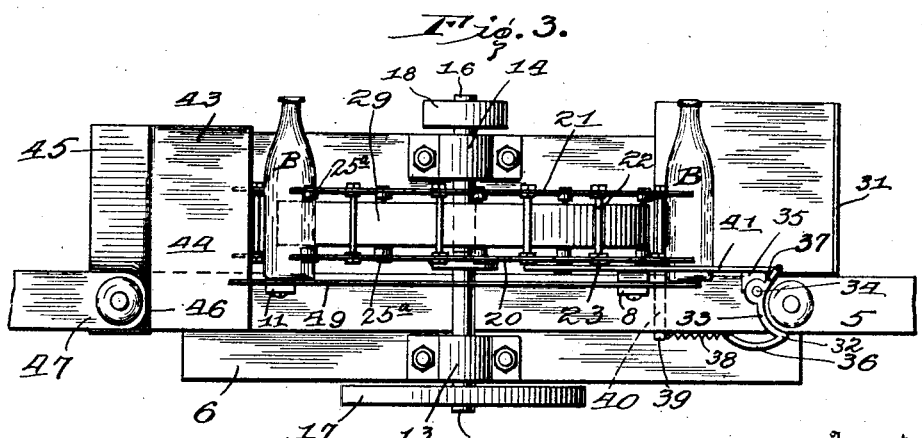

WILLIAM B. DOE, OF SKYLAND, NORTH CAROLINA.

MIXING ATTACHMENT FOR BOTTLING MECHANISM.

1,409,836.

Specification of Letters Patent.  Patented Mar. 14, 1922.

Application filed March 1, 1921. Serial No. 448,822.

*To all whom it may concern:*

Be it known that I, WILLIAM B. DOE, a citizen of the United States, residing at Skyland, in the county of Buncombe and State of North Carolina, have invented new and useful Improvements in Mixing Attachments for Bottling Mechanism, of which the following is a specification.

This invention relates to a mixing apparatus or mechanism in the form of an attachment especially adapted for use in an auxiliary capacity in association with standard types of bottle filling and capping machines which are particularly utilized in preparing, bottling and sealing corbonated beverages. The improved apparatus or attachment may also be used generally as a mixing means for any sort of contents of a bottle or other enclosure.

In bottling carbonated beverages according to general practice, the flavoring extracts or syrups and carbonated water or other liquid are separately introduced into the bottles and become stratified owing to a difference in specific gravity thereof, and the bottles so filled or charged are required to be subsequently agitated. After the bottles are filled or charged as specified they are capped or sealed and delivered by a suitable conveying device to a point where they are individually and manually handled to mix the contents and are then packed for shipping or stored for subsequent introduction into packing cases or receptacles. This manual mixing of the contents of bottles is obviously slow and tedious and ofttimes unreliable, and above all entails a considerable amount of labor and expense in bottling operations.

The purpose and main object of the present invention is to overcome the objections heretofore present in bottling operations by obviating entirely the necessity for individual manual handling of the bottles for the purpose of mixing the contents thereof by providing mechanism which will automatically remove the individual bottles from a conveying means and thoroughly mix the contents of the bottles and then replace the bottles on the said conveying means in an expeditious manner and with a materially reduced amount of labor and cost.

The invention is represented in the accompanying drawings and will be specifically referred to hereinafter to demonstrate one practical application of the essential features and functions of an organization of devices which are subject to, and intended to be replaced by, any equivalent mechanisms that may be permissible within the scope of the invention.

In the drawings:

Fig. 1 is a side elevation of mechanism embodying the features of the invention.

Fig. 2 is an end elevation of the mechanism.

Fig. 3 is a top plan view of the same.

The improved mechanism is shown associated with a conveyer or belt 5 ordinarily used with standard types of bottle filling and capping machines, it being deemed unnecessary to illustrate any part of the bottle filling or capping mechanism, as the latter is unaffected as to change of organization to adapt the improved apparatus or attachment mechanism thereto. The improved apparatus or attachment mechanism is disposed adjacent to the conveyer or belt 5 so as to automatically displace and mix the contents of successive bottles B carried by the conveyer or belt and then replace them on the said conveyer or belt. The filled and capped bottles B are delivered from the filling and capping mechanism by the conveyer or belt 5 in upright positions, as clearly shown in the drawings.

One effective organization of the mechanism embodying the features of the invention comprises a base 6 having supporting uprights 7, 8, 9, 10, 11 and 12 disposed thereon at intervals and of such vertical extent as to adapt them to the particular application of other components which will be hereinafter more definitely explained. The uprights 10 have bearings 13 and 14 on their upper ends for separate transverse shafts 15 and 16 which are independently operated by pulleys or any other analogous driving elements 17 and 18, the shaft 16 being driven at a much faster rate of speed than the shaft 15. The power for driving the shafts 15 and 16 at suitable relative rates of speed may be taken from any suitable source and transmitted to the pulleys 17 and 18 by belts, not shown, and it will be observed that the pulley 18 is of much less diameter than the pulley 17 in view of the higher rate of speed to which the shaft 16 is required to be driven. Fixed on the inner extremity of the shaft 15 is a carrier 19 comprising opposite disks 20 and 21 connected by cross bolts 22 having their ends 23 projecting at the side of the mechanism nearest the belt 5 for a purpose which will be presently explained. This end projection of the bolts 22 will be regulated in accordance with the operation of the mechanism, but under ordinary conditions the nuts on the bolts at the front side of the machine will serve as ample projections to perform the function which these projecting extremities of the bolts are adapted to serve. Each disk 20 and 21 is formed with a plurality of pockets or bottle seats 24 each having one elongated inclined wall 25 and an opposite shorter inclined wall 26, the two walls merging into an inner arcuate terminal wall 27. The pockets or seats 24 are in transverse alinement in the two disks and these disks will be in such spaced relation as to effectively carry the bottles which are disposed to enter the said pockets or seats. The bolts 22 engage the disks 20 and 21 between the pockets or seats and sufficiently stiffen the carrier to render the latter effective in sustaining the weight of a number of filled bottles and thus provide for the formation of a carrier of comparatively light structure yet strong and durable and reinforced against lateral springing action. The pockets or seats 24 are also of such shape as to readily receive the bottles thereinto and positively hold the bottles in place against accidental displacement, and in view of the inclination of the longer wall 25, a discharge of the bottles from the carrier is facilitated and rendered positive. Near the outer terminals of the shorter walls 26 of the pockets, anti-frictional rollers 25$^a$ are secured on the opposite inner sides of the disks 20 and 21 to cause the bottles in the pockets to roll or rotate more readily and smoothly.

Within the carrier 19 an agitating means or wheel 28 is disposed and fixed on the shaft 16, the wheel being peripherally provided with a covering 29 of rubber or other soft material to set up a sufficient adhesion with relation to the bottles carried in the pockets 24 as to regularly and rather rapidly rotate the said bottles while they are held within the pockets. The wheel 28 is of such diameter as to project outwardly a slight distance beyond the inner portion of each pocket 24 to thereby have the covering 29 engage the bottles. In view of the difference of the rate of rotation of the shafts 15 and 16, the bottles in the slower moving carrier 19 will be subjected to a rotation by the more rapidly rotating mixing means 28 to thoroughly commingle or produce homogeneity of the liquid contents of the bottles before the latter are discharged from the carrier. The carrier 19 and agitating means or wheel 28 rotate in reverse directions, as indicated by the arrows, to effect a rapid rotation of the bottles taken up and held by the carrier.

A downwardly inclined receiver 30 is disposed in advance of the carrier 19 and rotary mixing means or wheel 28, the said receiver being supported by the upright 7 and having a vertical guard 31 at the front end thereof. The receiver 30 projects at its upper front extremity above the plane of the conveyer or belt 5, and adjacent thereto a bottle displacer 32 is mounted and consists of a segmental arm 33 intermediately fulcrumed, as at 34, on a bracket 35 extending from the adjacent edge of the receiver 30. The arm 33 acts similarly to a hook and at its outer end has a rearwardly extending separator 36 and an inner extension or attaching arm 37. The separator 36 is curved and disposed at an angle to the arm 33, and to the separator a coiled spring 38 is connected and also to a post 39 supported by a suitable arm 40 extending from the lower portion of the receiver 30. To the extension or attaching arm 37 of the segmental displacing arm 33 a connecting rod 41 is movably attached and pivoted to the upper end of an actuating lever 42, the latter lever being fulcrumed on the upper portion of the upright 9 and depending at such an angle and at such distance from the outer or front disk 20 of the carrier as to be regularly engaged by the bolt extensions or nuts 23 of the bolts 22 and thereby trip the lever 42 at intervals and effect a drawing action on the connecting rod 41 and cause the segmental arm and separator 36 to move inwardly or swing in a curved line over the upper portion of the conveyer belt 5 against the resistance of the spring 38. The arm 33 and separator 36 continue to move inwardly over the belt 5 in the arc of a circle as long as the projecting extremities or nuts 23 of the bolts 22 engage the lever 42, but as soon as the said projections or nuts ride off the lower end of the lever as the carrier rotates the spring 38 comes into play and restores all the parts of the displacer, including the connecting rod 41 and lever 42, to normal position ready for a subsequent similar operation.

The bottles are discharged from the pockets or seats 24 of the carrier onto a downwardly inclined table or support 43 held by the upper extremity of the upright 12 and carrying at its lower side a bottle receiver 44 having an upper comparatively narrow inclined trough 45 regularly merging into a vertical chute 46 with a rear open side 47 and an open bottom 48, the chute 46 standing over the conveyer or belt 5.

All of the parts of the mechanism or improved apparatus or attachment are so arranged as to clear the belt when disposed close to the latter, and there will, therefore, be no interference with the regular movement of the conveyer belt by any of the parts of the mechanism.

As an auxiliary feature, a segmental shield 49 is applied adjacent to the outer side of the disk 20 of the carrier 19 and held by the uprights 8 and 11, the purpose of this shield being to prevent the bottles from slipping longitudinally out of place in the pockets or seats 24. This shield 49, while not absolutely necessary, will be found to be an effective attachment to the improved mechanism. Under ordinary conditions the bottles will maintain their engagement with the pockets or seats 24 owing to the weight of the bottles and contents thereof, but as a precaution against any unusual movement of the bottles in the pockets or seats the shield is used.

From the foregoing explanation the simple operation of the improved mechanism or attachment will be readily understood. As the bottles B are brought up to the location of the receiver 30 by the conveyer or belt 5, they will be individually engaged by the displacer and particularly by the arm 33, which bears on the bottles at a distance above the bottoms thereof, and each bottle will be pushed laterally towards the receiver and strike the projecting portion of the edge of the receiver and be turned over in a horizontal position and roll by gravitation towards the lower end of the receiver and be so held by the peripheral edges of the disks 20 and 21 until a pocket is brought into engaging relation to the bottle, when the latter rolls into the pocket and is taken upwardly by the carrier, the displacer just prior to the engagement of the bottle with a pocket or seat in the carrier having returned to normal position for receiving a subsequent bottle, which is similarly shifted laterally and overturned into a horizontal position, and so on in connection with all succeeding bottles that are transmitted by the conveyer or belt 5 within operative engagement with the arm 33 of the displacer. As the arm 33 arcuately moves inwardly over the conveyer or belt 5, the separator 36 similarly moves over the conveyer and serves to space the bottles, and particularly the bottles next in rear to that engaged by the arm 33, to prevent crowding of the bottles against the displacer and to permit the latter to regularly operate in removing the bottles from the conveyer or belt and disposing them on the receiver 30. The bottles taken up by the pockets or seats 24 are rapidly rotated by the rotary mixing means or wheel 28, and as the said pockets rise towards and reach their highest elevation, it will be seen that the weight of the bottles and their contents will insure a positive engagement thereof with the said rotary mixing means or wheel and cause the contents to be thoroughly commingled. When each bottle-charged pocket or seat 24 arrives adjacent to the table 43, or when the longer inclined wall 25 of the pocket or seat alines with the inclined top of the table 43, the bottle rolls or gravitates from the pocket onto the table and then from the latter into the trough 45 and is tilted downwardly, in view of the inclination of the trough bottom, and gradually turned vertically into the chute 46 by reason of the fact that the heavier body portion of the bottle is disposed on the lower part of the trough bottom and close to and free to enter the upper open end of the vertical chute 46. The bottle drops in upright position through the chute 46 and is regularly replaced on the belt and moved by the latter through the rear open side 47 of the chute. This operation is similar in connection with each bottle, and in view of the number of pockets the carrier will take up and be changed with a plurality of the bottles at one time, and thereby the mixing agitation will be effected in relation to a number of bottles and their contents and the bottles so treated rapidly discharged onto the belt and replaced in upright position in the manner explained.

What is claimed is:

1. A mixing attachment mechanism consisting of a rotary carrier having peripheral means for holding bottles, a rotary mixing means within the carrier having a greater speed of rotation than the latter, and means for effecting placement of filled bottles in the carrier for engagement by the mixing means.

2. A mixing attachment mechanism consisting of a rotary carrier having peripheral means for holding bottles, a rotary mixing device within the carrier having a more rapid rotation than the latter, means for effecting placement of bottles in the carrier, and means upon which the bottles are discharged from the carrier.

3. A mixing attachment mechanism consisting of a rotary carrier having peripheral means for holding bottles in horizontal position, a rotary mixing device within the carrier having a greater rate of speed than the latter, and means for automatically disposing filled bottles from an upright position into a horizontal position and effecting placement thereof in the carrier.

4. A mixing attachment mechanism consisting of a rotary carrier having peripheral means for holding bottles in horizontal position, a rotary mixing device within the carrier having a greater rate of speed than the latter, means for automatically disposing filled bottles from an upright position into a horizontal position and effecting placement thereof in the carrier, and a table upon which the bottles are discharged from the carrier in horizontal position having means associated therewith for restoring the bottles to upright position.

5. A mixing organization consisting of a rotary carrier having peripheral means for receiving bottles, and a rotary mixing means within the carrier for engaging and rotating the bottles and having a greater speed of rotation than the said carrier.

6. In a mechanism of the class specified, the combination with a conveyer for transporting filled and sealed bottles in upright positions thereon, of a mixing mechanism disposed adjacent to the conveyer and consisting of means for removing the bottles from the conveyer and disposing the bottles in horizontal positions, mixing mechanism including a rotary carrier and rotary mixing means therein having a greater speed of rotation than the carrier and with which the bottles are caused to engage, and means upon which the bottles are discharged from the mixing mechanism provided with a device for restoring the bottles to upright positions and replacing them on the conveyer.

7. In a mechanism of the class specified, the combination with a conveyer upon which filled and capped bottles are disposed in upright positions, of means for removing the bottles from the conveyer and turning them into horizontal positions, means for receiving the bottles in horizontal positions and effecting a thorough mixing of the contents thereof and including a rotary carrier and rotary mixing element having a relative difference in speed of rotation, and a device upon which the bottles are discharged in horizontal positions provided with means for restoring the bottles to upright positions and replacing them on the conveyer.

8. In a mechanism of the class specified, the combination with a conveyer upon which filled and capped bottles are disposed, of means for removing the bottles from the conveyer and also for replacing the bottles on the conveyer, and rotary carrying means between the point of removal and replacement of the bottles in addition to the carrying operation thereof relatively to the conveyer provided with means for individually rotating the bottles to mix the contents thereof.

9. In a mechanism of the class specified, the combination with a conveyer upon which filled and capped bottles are disposed, of means for removing the bottles from the conveyer and also replacing the bottles on the conveyer, and rotary carrying means between the points of removal and replacement of the bottles relatively to the conveyer having a device for individually rotating the bottles at a higher speed of rotation than the rotation of the carrying means to mix the contents thereof.

10. In a mechanism of the class specified, the combination with a conveyer upon which filled and capped bottles are disposed, of means for removing the bottles from the conveyer and other means for replacing the bottles on the conveyer, and means between the points of removal and replacement of the bottles relatively to the conveyer for bodily transferring the bottles from one point to the other and at the same time individually rotating the bottles at a higher rate of speed than the speed of transfer thereof for agitating the contents of each bottle for thoroughly mixing the said contents.

11. In a mechanism of the class specified, the combination with a conveyer upon which filled and capped bottles are disposed, of means for removing the bottles from the conveyer and replacing the bottles on the latter, and carrying means between the points of removal and replacement of the bottles relatively to the conveyer having a bottle rotating device associated therewith, the carrying means and bottle rotating device having reverse directions of rotation.

12. In a mechanism of the class specified, the combination with a conveyer upon which filled and capped bottles are disposed, carrying means adjacent to the conveyer for transferring the bottles from one point to another relatively to the conveyer and having a series of pockets with anti-frictional rollers exposed therein, a bottle rotating device associated with the carrying means, the carrying means and bottle rotating device moving in reverse directions, and means for removing the bottles from the conveyer for engagement by the carrying means and replacing the bottles on the conveyer from the carrying means.

13. In a mechanism of the class specified, bottle agitating means consisting of a carrier having a bottle rotating device disposed therein and operating reversely to the carrier.

14. In a mechanism of the class specified, a bottle carrying means having pockets with anti-frictional rollers exposed therein for engagement with the bottles held by the pockets, and a bottle rotating device associated with the bottle carrying means and moving in a direction reverse to the direction of movement of said carrying means.

In testimony whereof I have hereunto set my hand in presence of two subscribing witnesses.

WILLIAM B. DOE.

Witnesses:
 HENRY C. GUDGER,
 JAMES M. COLEMAN.